United States Patent [19]

Burrill

[11] 4,364,900

[45] Dec. 21, 1982

[54] DEPOSIT SUPPRESSION IN THE CORE OF WATER-COOLED NUCLEAR REACTORS

[75] Inventor: Kenneth A. Burrill, Deep River, Canada

[73] Assignee: Atomic Energy of Canada Limited, Ottawa, Canada

[21] Appl. No.: 907,157

[22] Filed: May 17, 1978

[30] Foreign Application Priority Data

Jun. 9, 1977 [CA] Canada ................... 280204

[51] Int. Cl.$^3$ ............................................. G21C 19/32
[52] U.S. Cl. ....................................... 376/306; 376/310
[58] Field of Search .............. 176/37, 38, 92 R, 92 A, 176/92 B, 46; 210/696; 122/379; 60/646; 134/2, 22 R; 376/306

[56] References Cited

U.S. PATENT DOCUMENTS

| | | | |
|---|---|---|---|
| 2,907,689 | 10/1959 | Kidder | 176/38 |
| 3,013,909 | 12/1961 | Pancer | 176/37 |
| 3,113,916 | 12/1963 | Abbott | 176/46 |
| 3,173,404 | 3/1965 | Bloom | 122/379 |
| 3,248,269 | 4/1966 | Bell | 134/2 |
| 3,294,644 | 12/1966 | Walton | 176/38 |
| 3,400,022 | 9/1968 | Osamu | 122/379 |
| 3,496,017 | 2/1970 | Weed | 176/37 |

FOREIGN PATENT DOCUMENTS

823849 9/1969 Canada.

OTHER PUBLICATIONS

Hicks, J. H. "Recent Concerns with Reactor Coolant Chemistry Technology in Pressurized Water Reactors" 29 Nuclear Technology, May, 1976, pp. 146–152.
Sweeton, F. W. and Baes, Jr., C. F., 2 J. Chem. Thermo, 1970, p. 479, [C. F. specification at p. 6].

Primary Examiner—Sal Cangialosi
Attorney, Agent, or Firm—Alan A. Thomson

[57] ABSTRACT

In pressurized water-cooled nuclear reactors, the formation of deposits on surfaces in the core of the reactor, e.g. on fuel sheaths, is suppressed by maintaining in the circulating pressurized water, a high concentration of ammonia ranging from about 120 to about 200 mg $NH_3$/kg water. Crevice corrosion of the fuel sheaths is avoided, even under localized boiling conditions, since the pH never attains a corrosively high level. The crevice corrosion danger with lithium can be reduced by replacing part of the lithium with ammonia.

11 Claims, No Drawings

DEPOSIT SUPPRESSION IN THE CORE OF WATER-COOLED NUCLEAR REACTORS

BACKGROUND OF THE INVENTION

This invention is concerned with suppressing the deposition of corrosion products on fuel elements and other surfaces in the core of water-cooled nuclear power reactors.

Water-cooled nuclear power reactors have piping and components made of structurally strong materials. However, at least part of these materials continuously release by slow corrosion small amounts of metals to the hot water flowing over them. Common structural materials behaving in this way are carbon steels, stainless steels, and special Fe-Ni-Cr alloys such as Inconel-600 and Incoloy-800 (trademark). All these materials are normally used out-reactor, away from the neutron flux in the reactor core.

Zirconium alloys are used extensively in the core of water-cooled reactors because the atoms in zirconium are highly transparent to neutrons. However, some zirconium atoms do become radioactive. Fortunately, the zirconium alloys used for fuel sheathing of the $UO_2$ fuel pellets (and for the pressure tubes in CANDU reactors) do not release their corrosion products to the water in detectable amounts.

The out-reactor structural materials release elements such as Fe, Ni, Cr and Co. These metals appear as dissolved ions in the water and as 0.1-1 $\mu$m size particles. The metals may or may not be oxidized, partly depending on which phases are thermodynamically stable. In CANDU pressurized water reactors, iron is the major constituent in suspended particles in the coolant circuit, and the iron is present substantially as magnetite ($Fe_3O_4$). As well, iron is probably the major dissolved metal in the water.

Some of these corrosion product atoms do become radioactive just by being carried through the reactor core by the water. However, to account for the quantity of radionuclides (radioactive atoms) observed in the primary circuit of a reactor, the corrosion products must spend a longer time in the neutron flux. This is possible by forming a deposit on in-reactor surfaces which may then release deposited atoms days later. The deposit may form in two ways; by particle deposition or by crystal growth of a metal or its oxide from solution. The small particles of corrosion products are known to deposit from turbulent water on all circuit surfaces. If crystal growth is not also occuring, then the deposited particles slowly dissolve. These deposits are very light (usually <1 g metals/$m^2$), so there are few atoms in the deposit to become radioactive. The deposit atoms are thought to be chiefly released by dissolution. The dissolved radioactive atoms deposit on all surfaces, so the out-reactor surfaces have a field of gamma radiation around them. Calculations show that the faster the deposited particles are dissolved, the fewer radionuclides are produced. Therefore, the deposits should be encouraged to dissolve.

Deposit formation by crystal growth is less common, but can usually be deduced from the crystalline appearance of the deposit, and from the large deposit weight (usually >10 g metals/$m^2$). A large inventory of radionuclides can accumulate in-reactor in these deposits. This is undesirable because deposit release would cause rapid growth of radiation fields out-reactor.

Reactors may operate with a direct or indirect cycle. Of primary concern here is a pressurized water reactor which must use the indirect cycle, but permits boiling to occur to a small degree in the reactor core. Both the pressure vessel (PWR) and pressure tube (CANDU PHWR) reactors can operate with some boiling.

In PWRs and PHWRs, the primary coolant usually has at least two deliberate additives: one additive to control the water pH, and another additive to combine with radiolytically-produced oxygen. Alkali metals (Li, Na, K) as hydroxides have been used to control the water pH in both PWRs and PHWRs, and so has ammonium hydroxide ($NH_4OH$). Hydrogen (or deuterium) gas is used to suppress radiolytic oxygen.

Boiling can concentrate alkali metal ions at the fuel sheaths. Any crevices which exist because of heavy deposits of corrosion products or because of the fuel sheath design (presence of appendages) can further promote high concentration differences between the bulk water and the water at the sheath surface, since the turbulent water cannot easily penetrate to flush the crevices. If the water pH exceeds pH 13 (at 25° C.), zirconium alloys corrode rapidly and fuel sheaths can be penetrated. Another disadvantage of alkali metals is that some alkali metals become radioactive in the neutron flux and increase radiation fields around the primary circuit. In addition lithium-6 produces tritium in the neutron flux. Tritium causes internal radiation exposure when inhaled or absorbed by humans.

Ammonium hydroxide cannot be concentrated to the same degree by boiling (as can the alkali metals) because ammonia is much more volatile and transfers to the steam bubbles. Therefore, ammonium hydroxide is a more desirable pH additive than are the alkali metals if crevice corrosion of in-reactor materials is likely. As well, ammonium hydroxide suppresses radiolytic oxygen too, so it serves a dual purpose. Heretofore ammonia has been used for pH control (corrosion prevention), and radiolytic oxygen suppression in nuclear reactor aqueous coolants, in concentrations below about 60 mg $NH_3$/kg water (usually 5-25 mg $NH_3$/kg). See Canadian Pat. No. 823,849 Rae et al., and U.S. Pat. No. 3,294,644 Walton.

Recently, it has been observed that, with ammonia concentrations in the range normally advocated, in a closed cycle primary coolant with some boiling occurring, heavy deposits accumulate on surfaces in the core of the reactor, particularly on fuel element sheaths. These deposits may restrict heat transfer and cause fuel sheath failure. The deposits raise the pressure loss of water pumped through the core, and contain a large quantity of radionuclides which if released from the core would cause a rapid growth of radiation fields outside the core.

SUMMARY OF THIS INVENTION

In accordance with this invention, deposits in the reactor core are suppressed and minimized (while corrosion and radiolytic oxygen are also controlled) by maintaining high ammonia concentrations in the primary aqueous coolant. The invention includes a method of suppressing the build-up of deposits on surfaces in the core of a nuclear reactor through which pressurized water is circulated comprising maintaining in the circulating water, a high concentration of ammonia within about 120 to about 200 mg $NH_3$/kg water. The invention also covers a water-cooled nuclear reactor wherein the primary water coolant is pressurized and contains from about 120 to about 200 mg $NH_3$/kg water. Preferably, the concentration of ammonia is near about 130-150 mg $NH_3$/kg water, or equivalent amounts of deuterated ammonia.

As a further aspect of this invention, the crevice corrosion problem with lithium additions to the coolant (for pH control) can be reduced by substituting ammonia for part of the lithium to give a coolant pH of from 10 to about 10.7 at 25° C. The amounts of ammonia may range up to about 200 mg $NH_3$/kg as before, increasing amounts of ammonia being required as the lithium concentration decreases.

DETAILED DESCRIPTION AND TEST RESULTS

This invention is applicable to any pressure vessel or pressure tube type reactors which permit boiling of the primary aqueous coolant in the core and operate with a closed cycle of primary coolant. Whenever the outlet flow of coolant from the reactor has at least some steam content, the high ammonia additions of this invention would be appropriate. The primary coolant is usually under pressures of from about 4 to 11 MPa and temperatures of about 250° to 320° C. The pH of this primary coolant will be controlled to vary from about 10 to about 10.7 due to the concentration of the pH control additive, this pH being above the value where magnetite solubility is a minimum.

The dissolved hydrogen concentration will normally be within the range of about 30 to about 80 $cm^3$ $H_2$/kg as a result of the specified water chemistry.

The ammonia decomposes gradually under radiolysis in the core to give nitrogen and hydrogen gases. Therefore, ammonia should be supplied continuously to maintain the desired concentration (when reactor is operating). The concentration of ammonia must be maintained above that needed to reach a pH which gives a minimum value of magnetite solubility which was observed with strong bases, i.e., minimum equivalent to strong base pH of about 9.3 to 9.9 at 25° C. Preferably the pH with ammonia is within about 10.5 to 10.7 at 25° C. This pH can be slightly lower when lithium is present.

It is believed that magnetite behaviour will determine the behaviour of all other deposit species of concern here when magnetite is the major deposit species. From the solubility data for magnetite given by F. W. Sweeton and C. F. Baes Jr. In J. Chem. Thermo. 2, 479 (1970), the following table can be derived for the location of the minimum magnetite solubility on a graph plotting solubility versus pH (strong base at 25° C.).

| Temp. °C. | pH (25° C.) for Solubility Minimum | Equivalent Ammonia Concentration (mg/kg) | pH (25°C.) With Ammonia |
|---|---|---|---|
| 250 | 9.85 | 95 | 10.49 |
| 275 | 9.8 | 111 | 10.53 |
| 300 | 9.3 | 37 | 10.21 |

Notes:
Dissolved hydrogen concentration, 18 $cm^3$/kg.

The equivalent ammonia concentration corresponding to the magnetite solubility minimum (solubility versus strong base pH at 25° C.) is seen to be from about 37 to about 110 mg $NH_3$/kg. Thus the ammonia concentration should be maintained above about 120 mg/kg, preferably about 130-150 for applicant's purpose. Since the ammonia tends to become more concentrated in the liquid phase close to the fuel element surface on boiling (compared to the bulk of the liquid phase), causing the local pH to rise, the ammonia concentration must be sufficient to assure that the net corrosion product solubility increases with increased localized pH in order to minimize deposit formation in core.

The upper limit of the ammonia concentration is not critical but there is no advantage in going above about 200 mg $NH_3$/kg and the costs may become excessive. Corrosion of steel surfaces within the circuit would be expected to become significant only at high pH values impossible to attain with ammonia.

Where heavy water is serving as primary coolant, the ammonia would usually be deuterated before addition to the coolant. The concentration range 140-240 mg $ND_3$/kg should be adequate to cause magnetite dissolution from in-core surfaces, in heavy water. The 140-240 mg $ND_3$/kg $D_2O$ corresponds to the 120-200 mg $NH_3$/kg $H_2O$.

Experimental Results

Experiments were run in a reactor test loop to measure corrosion product deposition on fuel elements. The water contained either a low or a high concentration of $NH_4OH$. The dissolved hydrogen concentration was about 50 $cm^3$ $H_2$/kg $H_2O$ with $NH_4OH$. Table 1 gives typical exposure conditions. Tables 2 and 3 give the detailed results from each test. The major chemical species (Fe, Ni, Cu, Cr, Co) and some of their radionuclides (Co-58, Co-60, Cr-51, Fe-59) are given in the tables. Table 4 summarizes the results of the two tests.

The deposit weight and appearance in Test #2 suggested that crystal growth did not occur. Rather the deposit must have formed by particle deposition, and therefore was slowly dissolving. The deposit weights were about 10 times less in test #2 with "high" $NH_3$ (according to this invention), than in test #1 with typical "low" $NH_3$.

As the last line in Table 4 indicates, pH control with lithium is effective to minimize in-core deposits (but will allow in-core crevice corrosion on localized boiling). The localized pH rise to corrosive levels on boiling with lithium can be reduced by substituting part of the lithium with ammonia. Mixtures of lithium and ammonia giving a pH of from 10 to about 10.7 at 25° C. in the coolant, can be used to decrease crevice corrosion (compared to use of lithium alone). As before, the amount of ammonia will range up to about 200 mg $NH_3$/kg, with the amount of lithium required decreasing as the ammonia increases, and the resulting coolant pH preferably being within the range 10.2 to about 10.7 at 25° C. The lithium is suitably added as a concentrated LiOH solution.

For a more detailed description of the fuel string and test layout, see K. A. Burrill Can. J. Chem. Eng. 55(1) 54 (1977).

TABLE 1

| OPERATING CONDITIONS FOR IN-REACTOR EXPERIMENT | |
|---|---|
| Exposure Time | about 45 effective full power days |
| Water flow rate | 0.745 kg/s |
| Pressure - test section inlet | 7.93 MPa |
| Temperature | |
| test section inlet | 286° C. |
| test section outlet | 293° C. |
| Outlet Steam Quality | 7.2 wt % |
| Water chemistry - pH and $NH_3$ concentrations | controlled by additions of concentrated $NH_4OH$ |

TABLE 1-continued
OPERATING CONDITIONS FOR IN-REACTOR EXPERIMENT

| | |
|---|---|
| dissolved hydrogen | solution to give 11 or 130–150 mg $NH_3$/kg 50 $cm^3$/kg |
| particulate solids | 2–6 µg/kg |
| Thermal neutron flux | $7.85 \times 10^{17}$ $n/m^2s$ |
| Fast neutron flux | $\approx 3.90 \times 10^{17}$ $n/m^2s$ |
| Maximum surface heat flux | |
| dummy fuel | 0 |
| natural $UO_2$ fuel | 0.4 $MW/m^2$ |
| enriched $UO_2$ fuel | 1.1 $MW/m^2$ |
| Fuel string power - gross | 0.119 MW |
| net (allowing for heat loss to core surroundings) | 0.106 MW |
| Average Reynolds number in fuel string | $0.81 \times 10^5$ |

TABLE 2
CHEMICAL AND γ-SPECTROMETRIC ANALYSES OF FUEL STRING DEPOSITS
TEST #1–11 mg $NH_3$/kg $H_2O$

| ELEMENT[1] | DEPOSIT[2] WEIGHT (g/$m^2$) | CHEMICAL ANALYSIS (g/$m^2$) | | | | | γ-SPECTROMETRIC ANALYSIS[3] (mCi/$m^2$) | | | |
|---|---|---|---|---|---|---|---|---|---|---|
| | | Fe | Cr | Cu | Ni | Co | Co-58 | Co-60 | Cr-51 | Fe-59 |
| JJT[i] | 0.88 | 0.64 | 0.023 | 0.006 | 0.015 | 0.002 | 0.04 | 0.49 | 3.49 | 3.52 |
| S | 2.61 | 1.89 | 0.023 | 0.006 | 0.015 | 0.002 | 0.15 | 3.65 | 7.04 | 13.4 |
| HZZ | 4.42 | 3.20 | 0.023 | 0.006 | 0.023 | 0.002 | 0.17 | 4.41 | 18.1 | 20.8 |
| Y* | 1571 | 1137 | 4.07 | 0.132 | 0.263 | 0.24 | 0.04 | 0.32 | 5.17 | 3.74 |
| NNP[i] | 10.9 | 7.90 | 0.034 | 0.011 | 0.034 | 0.002 | 0.42 | 3.53 | 38.9 | 62.0 |
| N | 10.8 | 7.78 | 0.034 | 0.006 | 0.034 | 0.002 | 0.51 | 4.32 | 48.7 | 66.9 |
| M | 5.64 | 4.08 | 0.023 | 0.006 | 0.015 | 0.002 | 0.30 | 3.92 | 31.8 | 40.3 |
| L | 4.56 | 3.30 | 0.023 | 0.011 | 0.023 | 0.002 | 0.18 | 2.70 | 10.9 | 13.4 |
| SKP[i] | 15.1 | 10.9 | 0.046 | 0.006 | 0.046 | 0.002 | 1.68 | 9.41 | 122.4 | 122.5 |
| N | 27.5 | 19.9 | 0.103 | 0.011 | 0.115 | 0.007 | 1.67 | 9.20 | 118.9 | 119.9 |
| M | 21.6 | 15.6 | 0.080 | 0.010 | 0.080 | 0.005 | 1.65 | 8.23 | 116.4 | 129.8 |
| L | 12.8 | 9.24 | 0.046 | 0.010 | 0.046 | 0.002 | 0.98 | 4.73 | 56.6 | 77.9 |
| 678A | 2.13 | 1.54 | 0.043 | 0.011 | 0.022 | 0.004 | 0.03 | 0.59 | 2.84 | 3.87 |
| B | 8.82 | 6.38 | 0.043 | 0.011 | 0.022 | 0.004 | 0.03 | 0.52 | 2.52 | 3.13 |
| C | 3.39 | 2.45 | 0.043 | 0.011 | 0.043 | 0.004 | 0.03 | 0.58 | 3.38 | 3.83 |

NOTES for Table 2
[1]HZ, JJ - Dummy elements (in-core)
NN - 0.82 wt % Enriched $UO_2$
SK - 2.76 wt % Enriched $UO_2$
678 - Dummy elements (out of flux)
[i]at inlet to string
*HZY was contaminated during the descaling process
[2]Deposit weight calculated from chemical analysis by assuming only iron present as $Fe_3O_4$
[3]1 Ci = 37 GBq

TABLE 3
CHEMICAL AND γ-SPECTROMETRIC ANALYSES OF FUEL STRING DEPOSITS
TEST #2–130–150 mg $NH_3$/kg

| Element[1] | Deposit[2] Weight (mg/$m^2$) | Chemical Analysis (mg/$m^2$) | | | | | γ-Spectrometric Analysis[3] (mCi/$m^2$) | | | |
|---|---|---|---|---|---|---|---|---|---|---|
| | | Fe | Cr | Cu | Ni | Co | Co-58 | Co-60 | Cr-51 | Fe-59 |
| 4[i] | 112 | 81.0 | <0.87 | 1.31 | <0.87 | <0.44 | 0.24 | 1.37 | 24.5 | 6.08 |
| 3 | 129 | 93.2 | <0.87 | <0.87 | 0.87 | <0.44 | 0.30 | 1.11 | 11.2 | 4.03 |
| 2 | 358 | 259 | 1.31 | <0.87 | 1.31 | <0.44 | 0.45 | 1.95 | 28.1 | 10.5 |
| 1 | 430 | 311 | 1.31 | 1.48 | 1.31 | <0.44 | 0.34 | 2.0 | 21.5 | 10.6 |
| 8[i] | 670 | 485 | 3.48 | <0.87 | 2.61 | <0.44 | 0.39 | 3.41 | 40.6 | 15.1 |
| 7 | 1441 | 1043 | 5.23 | 1.48 | 6.53 | <0.44 | 1.0 | 6.64 | 55.4 | 37.3 |
| 6 | 760 | 547 | 1.74 | 0.87 | 2.35 | <0.44 | 0.70 | 3.24 | 38.5 | 22.3 |
| 5 | 1008 | 729 | 3.05 | 1.92 | 3.22 | <0.44 | 0.81 | 4.62 | 38.8 | 31.9 |
| 12[i] | 2633 | 1905 | 13.1 | 0.87 | 14.8 | 1.74 | 2.0 | 13.9 | 88.2 | 70.8 |
| 11 | 2549 | 1844 | 10.5 | 1.31 | 13.1 | 1.74 | 2.03 | 13.3 | 82.3 | 67.9 |
| 10 | 3752 | 2715 | 17.4 | 1.92 | 16.6 | 10.0 | 2.88 | 16.1 | 100.2 | 101 |
| 9 | 507 | 363 | 0.87 | <0.87 | 1.48 | <0.44 | 1.48 | 7.58 | 40.9 | 38.5 |
| 678 A | 121 | 87.3 | <1.98 | <1.98 | <1.98 | <1.0 | 0.03 | 6.88 | 0.91 | 0.69 |
| B | 80 | 57.5 | <1.98 | <1.98 | <1.98 | <1.0 | — | 0.57 | — | 0.50 |
| C | 93 | 67.5 | <1.98 | <1.98 | <1.98 | <1.0 | 0.02 | 0.78 | 1.28 | 0.50 |

NOTES for Table 3
[1]1,2,3,4 - dummy elements
5,6,7,8 - natural $UO_2$
9,10,11,12 - 2.4 wt % enriched $UO_2$
678 - dummy elements (out of flux)
[i]at inlet to string
[2]Deposit weight calculated from chemical analysis by assuming only iron present as $Fe_3O_4$
[3]1 Ci = 37 GBq

TABLE 4
EFFECT OF WATER CHEMISTRY ON FUEL SHEATH DEPOSITS
Exposure Time ≈ 45 days

| Water Chemistry[c] | Deposit Weight[a] Iron g/m² | Deposit Weight[a] All oxides[b] g/m² |
|---|---|---|
| (1) 11 mg NH₃/kg, 50 cm³ H₂/kg | 19.9 | 27.5 |
| (2) 150 mg NH₃/kg, 50 cm³ H₂/kg | 1.8 | 2.5 |
| (3) pH 10.2, LiOH, 10 cm³ H₂/kg | 0.04 | 0.06 |

[a]For element with highest surface heat flux (about 1.1 MW/m²), element area 240 cm².
[b]"All oxides" means $Fe_3O_4$, $NiO$, $CuO$, $Cr_2O_3$, and $CoO$.
[c]All elements exposed for about 45 days to boiling water at 293° C.

I claim:

1. A method of suppressing the build-up of deposits on surfaces and minimizing crevice corrosion in the core of an operating nuclear reactor through which pressurized water is circulated and in which localized boiling may occur, comprising maintaining in the circulating water one of (a) a high concentration of ammonia within about 120 to about 200 mg NH₃/kg water, and (b) a mixture of ammonia and lithium giving a pH of 10 to about 10.7 at 25° C.; with the ammonia being selected from ammonia of normal isotopic composition and equivalent amounts by wt. of deuterated ammonia.

2. The method of claim 1 wherein the concentration of ammonia in (a) is about 130–150 mg NH₃/kg water or equivalent amounts by wt. of deuterated ammonia.

3. The method of claim 1 wherein the pressurized water comes into contact with iron-containing alloys or steels during its circulation as primary coolant.

4. The method of claim 1 wherein the water pH with ammonia (a) is within the range of about 10.5 to 10.7 at 25° C.

5. The method of claim 1 wherein the circulating water is heavy water and the ammonia is deuterated before addition.

6. The method of claim 1 wherein ammonia and lithium are both added, the ammonia being maintained at a level below about 200 mg NH₃/kg and the pH at 25° C. being 10.2 to 10.7.

7. An operating water-cooled nuclear reactor wherein indirect cycle primary coolant, subject to localized boiling, is present which is pressurized and contains during operation one of (a) from about 120 to about 200 mg NH₃/kg water, and (b) mixtures of ammonia and lithium giving a pH of 10 to about 10.7 at 25° C.; with the ammonia being selected from ammonia of normal isotopic composition and equivalent amounts by wt. of deuterated ammonia.

8. The reactor of claim 7 wherein the ammonia concentration in (a) is about 130–150 mg NH₃/kg water, or equivalent amounts by wt. of deuterated ammonia.

9. The reactor of claim 7 wherein the primary coolant circuit contains iron-containing alloys or steels.

10. The reactor of claim 7 wherein the primary coolant is heavy water and the ammonia is deuterated.

11. The reactor of claim 7 wherein the primary coolant contains both ammonia and lithium, with the ammonia being maintained at a level below about 200 mg NH₃/kg and the pH at 25° C. being 10.2 to 10.7.

* * * * *